Inventors:
Hans Boekels,
Adolf Brosch,
by Harry E. Dunham
Their Attorney.

Patented July 15, 1941

2,249,452

UNITED STATES PATENT OFFICE 2,249,452

ELECTRICAL MEASURING APPARATUS

Hans Boekels, Berlin-Wannsee, and Adolf Brosch, Berlin-Treptow, Germany, assignors to General Electric Company, a corporation of New York Application February 16, 1940, Serial No. 319,370
In Germany January 2, 1939

3 Claims. (Cl. 171—95)

This invention relates to electrical measuring apparatus, and particularly to apparatus of the type employing dry rectifiers and a direct current instrument for measuring alternating electrical currents and voltages.

Alternating current measuring devices which employ dry rectifiers in connection with a direct current measuring instrument are considerably influenced by variations in frequency, the effect usually being that the indication of the measuring instrument falls with increasing frequency. This phenomenon is due principally to the fact that the internal capacitance of the rectifier elements in the blocking direction increases with the frequency of the applied alternating current and, as a result, an increasingly greater part of the input current or the current to be measured flows past the rectifier elements without rectification. The output direct current from the rectifier elements is thus reduced and the measuring instrument reads low.

It is accordingly the principal object of our invention to provide improved means for compensating the errors in the readings of the direct current measuring instrument caused by variations in frequency. Other objects and advantages will become apparent as the description proceeds.

In carrying our invention into effect in its preferred form, we connect a simple network comprising an ohmic resistance element of high permeability material and of non-inductive character across the alternating current input terminals and in shunt with the rectifier elements. The effective alternating current resistance offered by this ohmic resistance element increases with frequency due to the well-known phenomenon of "skin effect," and this increase in resistance with frequency tends to force more current through the rectifier elements with the result that a correspondingly greater current passes through the rectifier output terminals to the measuring instrument. We have observed that the influence on the rectifier impedance due to frequency variations, as determined experimentally, possesses a characteristic which is quite similar to that of the skin effect in a conductor.

Our invention will be better understood from the following description when considered in connection with the accompanying drawing and its scope will be pointed out with particularity in the appended claims.

Figure 1:
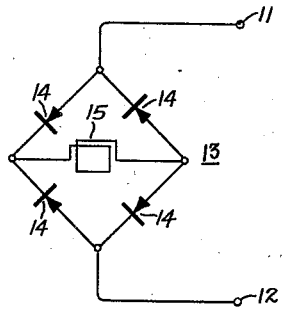
Figure 2:
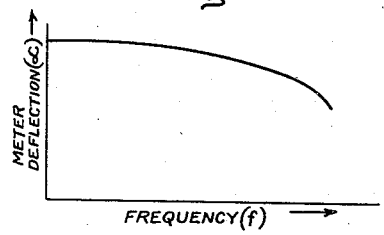
Figure 3:
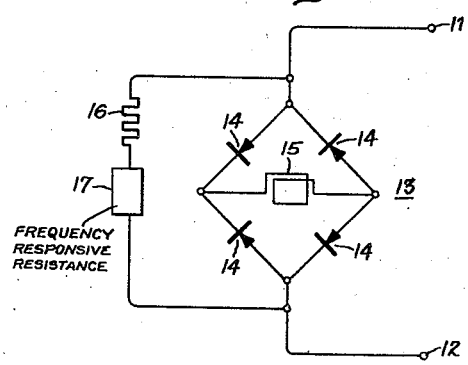

In the drawing Fig. 1 is a diagrammatic representation of a conventional rectifier bridge circuit for measuring alternating current quantities; Fig. 2 is a characteristic curve of the measuring device of Fig. 1; and Fig. 3 is a diagrammatic representation of apparatus for measuring alternating current quantities and arranged in accordance with our invention.

Similar reference characters refer to like parts in each of the figures of the drawing.

Referring to Fig. 1 of the drawing, the reference characters 11 and 12 represent the meter terminals in an alternating current circuit, the voltage or current of which is to be measured. The numeral 13 designates a rectifier bridge having dry rectifier elements 14 of the copper-oxide type, for example, connected in each of its four arms and having its output terminals connected in circuit with the movable coil element 15 of a sensitive direct current indicating instrument which may conveniently be of the d'Arsonval type.

The characterstic curve of Fig. 2 provides a typical illustration of the decrease in the angular deflection of the movable element 15 of the measuring instrument of Fig. 1 with constant alternating current of different frequencies applied to the input terminals 11 and 12. The deflection $\alpha$ of the movable element 15 under such conditions may be represented by the equation $$\alpha = \alpha_0(1 - K_1\omega^2) \quad (1)$$

where $\alpha_0$ is the meter deflection for a frequency equal to zero, $\omega = 2\pi$ times the frequency, and $K_1$ is a constant depending on the rectifier and the arrangement.

It has been proposed heretofore to eliminate the error due to frequency variations by connecting in series relation an inductance and a non-inductive resistance element which is independent of frequency in parallel to the alternating current terminals of the rectifier bridge, for example, across the terminals 11 and 12 of Fig. 1. In such an arrangement the reactance of the inductive element increases in accordance with the first power of the frequency.

In Fig. 3 we have illustrated an improved arrangement for compensating for variations in the readings given by the measuring instrument due to variations in the frequency of the alternating current. In this apparatus the input terminals of the rectifier bridge 13 are shunted by a simple network comprising a non-inductive or ohmic resistance 16 whose resistance is independent of frequency and a second non-inductive or ohmic resistance element 17 whose effective resistance varies with the frequency. The resistance element 17 has the characteristic that its effective resistance increases with increases in frequency due to the hereinbefore mentioned phenomenon of skin effect. Consequently, as the frequency increases the impedance of the shunting network to the flow of current will increase, thereby increasing the current flow through the rectifier elements and the coil 15 of the measuring instrument. Thus the ratio of the magnitude of the direct current flowing in the coil 15 to the magnitude of the alternating current flowing through the terminals 11 and 12 is maintained substantially independent of frequency variations.

A brief explanation of the theory underlying the change in the effective resistance of a conductor in response to the flow of a constant alternating current of various frequencies in the conductor, will provide a better understanding of our invention.

It is a familiar fact that the resistance of a conductor carrying an alternating current is larger than that for the same conductor at the same temperature when carrying direct current. This increase in resistance results because the current density is greater in the outer elements of the conductor than in the center so that in effect the cross section of the conductor is decreased. This crowding of the current to the outer portions of the conductor is known as "skin effect." If the conductor be considered as composed of a plurality of concentric filaments of the same area then each filament will have the same voltage drop per unit length. Since the current flowing in the conductor is alternating in character, this voltage drop is composed of the ohmic drop and a voltage of induction. However, there are more lines of flux surrounding the central part of the conductor so that the reactance is greater at the center than at the surface. It follows then that the ohmic drop along a filament at the center will be less than along one at the outer surface. Consequently, the density of the current is greater at the surface and this unequal distribution in current results in a larger power loss for a given R. M. S. alternating current than for the same value of direct current flowing in the conductor. The ratio of the effective alternating current resistance to the continuous or direct current resistance has been termed the "skin effect resistance ratio." We make use of this change in effective resistance with frequency in carrying out our invention.

The effective resistance of a conductor carrying alternating current may be stated by the following equation:

$$R = R_o\left(1 + 84.5\frac{f^2\mu^2 d^4}{\rho^2} - 5700\frac{f^4\mu^4 d^8}{\rho^4} + \ldots\right) \quad (2)$$

For this expression see "Transmission Line Engineering," Lewis, McGraw-Hill, 1928, p. 4.

In the Proceedings of the Institute of Radio Engineers for April, 1938, page 434, an expression for the effective resistance of a conductor carrying alternating current, for values of $x$ exceeding 3.0, where $$x = \pi d\sqrt{\frac{2\mu f}{\rho}},$$

is given as follows:

$$R = R_o(.25 - 3.55x) \quad (3)$$

In each of the above expressions,

R = resistance to alternating current
$R_o$ = resistance to direct current
f = frequency in cycles per second
d = diameter of wire in inches
$\mu$ = permeability
$\rho$ = resistivity in C. G. S. units Reference to Equations 2 and 3 shows that the effective alternating current resistance will be greater for large conductors than for small, for higher frequencies, for higher specific conductivities of material, and for conductors made of magnetic material. For this reason, we prefer to employ a magnetic material of high permeability for composing the resistance element 17. A suitable material, by way of illustration, is a nickel-iron alloy of the character described in United States Letters Patent 1,586,885 to G. W. Elmen. It will be appreciated that with a conductor made of magnetic material the permeability varies with the flux density and there also may be other losses introduced because of the hysteresis of the material. For this reason, an average value of permeability may be assumed in arriving at an approximation for properly proportioning the parts to be used in the electrical circuit.

The proportioning of the constants of the circuit depends upon the characteristics of the rectifiers used, the width of the frequency band over which the measuring apparatus is to be employed, and upon the permissible deviation from one hundred percent accuracy.

It will also be observed from Equation 2 that the compensating component, as illustrated by the second term, varies in accordance with the square of the frequency which is very desirable as indicated by Equation 1. Therefore the shunting action due to the capacity effect of the rectifier elements may be compensated over a wide frequency range. For a given constant alternating current flowing in the input terminals 11 and 12, we have found that apparatus constructed in accordance with our invention gives small errors up to 100,000 cycles. The use of such apparatus, in which the impedance of the combined measuring instrument remains substantially constant over a wide frequency range, is a distinct advantage not only in the case where direct measurements are being made but also in those cases where vacuum tubes are employed, particularly where it is important that the impedance of the energy receiving circuit be matched with the energy supplying circuit.

By making the elements 16 and 17 of the network of material having a positive resistance temperature co-efficient, we may also compensate for any errors caused by changes in the rectifying qualities of the rectifier elements due to changes in temperature.

While we have herein shown and described a particular arrangement of measuring apparatus embodying the principles of our invention, it will be appreciated that other schemes of connection may be employed without departing from the scope and spirit of our invention.

What we claim as new and desire to secure by Letters Patent of the United States, is:

1. In apparatus for measuring alternating current quantities, a rectifier having input terminals for connection to the alternating current quantity to be measured and having the characteristic of decreasing its direct current output in accordance with increases in the frequency of the alternating current quantity connected thereto, a direct current responsive element connected in circuit with the output terminals of said rectifier, and a substantially non-inductive resistance element composed of magnetic material and having a skin effect resistance ratio which increases substantially with frequency connected in shunt with the input terminals of said rectifier for compensating for errors due to variations in the frequency of said alternating current quantity.

2. In a device for measuring alternating current quantities, a copper-oxide rectifier having input terminals for connection to an alternating current quantity to be measured, a direct current measuring instrument connected in circuit with the output terminals of said rectifier, and a resistance element of high permeability magnetic material connected in parallel with the alternating current side of said rectifier, said resistance element being substantially non-inductive in character and having the characteristic that its effective resistance is appreciably altered in magnitude due to skin effect at high frequencies in such a manner that errors in the instrument reading caused by variations in the internal capacitance of said rectifier with variations in frequency are substantially compensated.

3. In electrical measuring apparatus, a dry rectifier having its input terminals supplied with alternating current, a direct current measuring instrument connected in circuit with the output terminals of said rectifier, and an electrical network connected across said input terminals, said network including a first ohmic resistance element and a second ohmic resistance element connected in series circuit relation, the resistance of said first resistance element being substantially independent of variations in frequency, and said second resistance element being composed of magnetic material and so constructed and arranged that its effective alternating current resistance increases appreciably with increases in the frequency of the alternating current supplied to said rectifier, whereby the ratio of the magnitude of the direct current flowing through said measuring instrument to the magnitude of the alternating current flowing between said input terminals is maintained substantially independent of the frequency of said alternating current.

HANS BOEKELS.
ADOLF BROSCH.